United States Patent [19]
Benjamin

[11] 3,776,656
[45] Dec. 4, 1973

[54] SPADE DRILL

[75] Inventor: Milton L. Benjamin, Chagrin Falls, Ohio

[73] Assignee: Erickson Tool Company, Solon, Ohio

[22] Filed: Sept. 25, 1972

[21] Appl. No.: 291,947

[52] U.S. Cl............................. 408/233, 408/239
[51] Int. Cl............................................ B23b 41/00
[58] Field of Search.................. 408/227, 228, 231, 408/232, 233, 239, 240

[56] References Cited
UNITED STATES PATENTS
2,400,856   5/1946   Thompson............................ 408/233
3,667,768   6/1972   Stokey............................ 408/239 X Primary Examiner—Leonidas Vlachos
Attorney—Walter Maky

[57] ABSTRACT

A spade drill characterized in that the slotted end of the holder in which the spade drill blade is clamped by a clamping screw extending through a hole in the blade has a set screw therein coaxially disposed with respect to the clamping screw and adjacent to the head thereof, said set screw being disposed eccentrically with respect to the blade hole and having a tapered end which engages one side of the blade hole thus to retain the blade in seating engagement with the bottom of the holder slot when the spade drill is retracted from the drilled hole.

6 Claims, 4 Drawing Figures

PATENTED DEC 4 1973   3,776,656
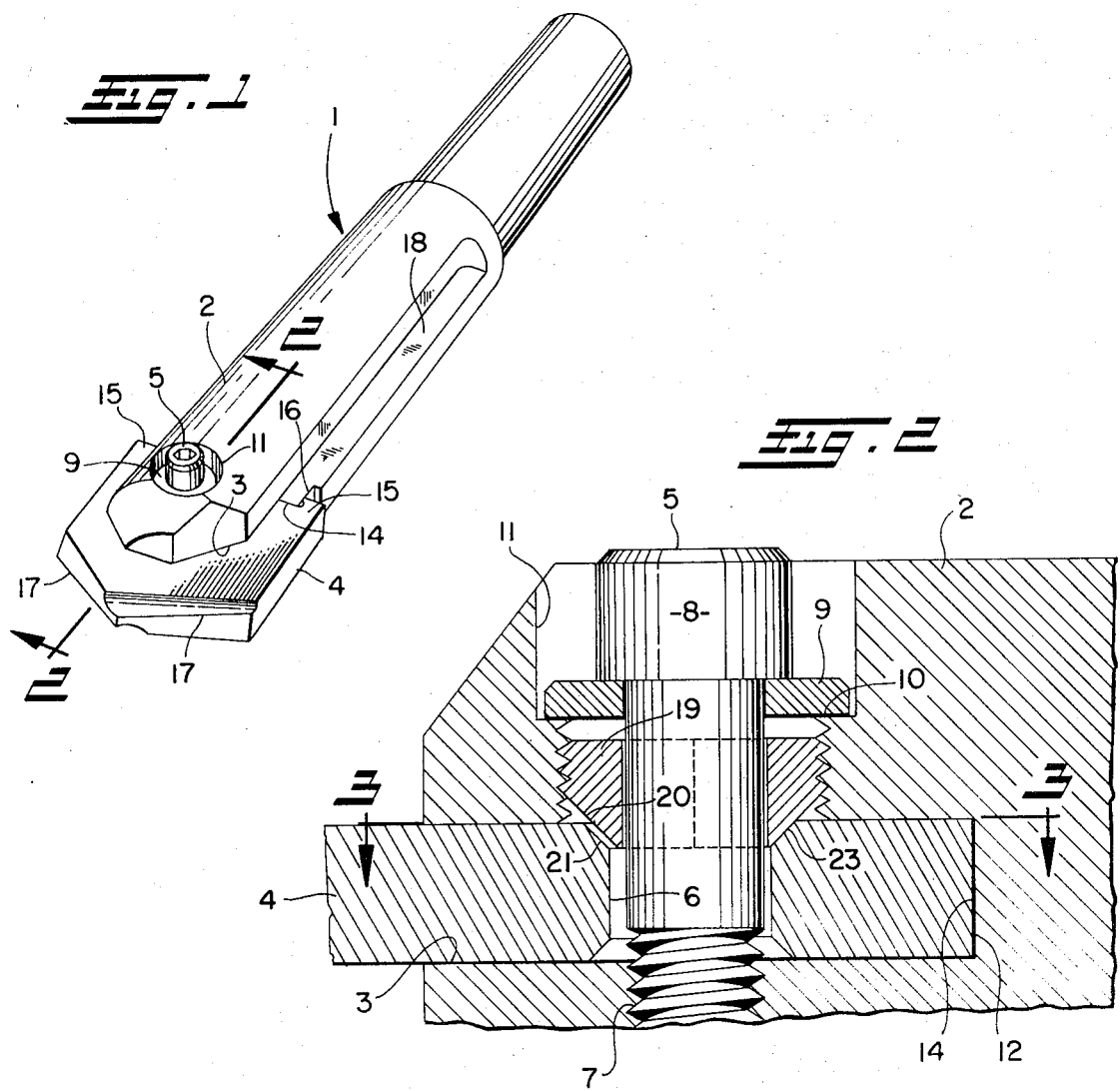

SPADE DRILL

BACKGROUND OF THE INVENTION

In known spade drills, the spade drill blade is clamped in the slotted end of the holder by means of a clamping screw which loosely extends through a hole in the blade and which is effective to squeeze the slotted end of the holder into gripping engagement with the blade. For examples of that type of spade drill reference may be had to the Milton L. Benjamin et al. U.S. Pat. Nos. 3,049,033, 3,065,580, 3,076,357, 3,364,800 and 3,658,434. Occasionally, when large pullout forces are encountered during retraction of the spade drill from the drilled hole, the blade may be unseated from and tilted with respect to the bottom of the holder slot thus to mar the drilled hole.

SUMMARY OF THE INVENTION

With the foregoing in mind it is a principal object of this invention to provide a spade drill in which the blade is not only firmly and accurately clamped in the holder to withstand torque and axial thrust loads encountered during the hole drilling operation but in which the blade is also retained against unseating of its rear end from the bottom of the holder slot during retraction or withdrawal of the spade drill from the drilled hole.

It is another object of this invention to provide a spade drill of the character indicated in which the blade anti-pullout and anti-tilt retainer is disposed coaxially of the blade clamping screw adjacent the head thereof and is disposed eccentrically of the blade hole so as to engage one side of the blade hole to retain the rear end of the blade in seated engagement with the bottom of the holder slot.

Other objects and advantages of the present invention will appear hereinafter.

BRIEF DESCRIPTION OF THE DRAWING

FIG. 1 is a perspective view of a spade drill embodying the present invention;

FIG. 2 is a cross-section view on enlarged scale taken substantially along the line 2—2, FIG. 1;

FIG. 3 is a cross-section view on reduced scale taken substantially along the line 3—3, FIG. 2; and FIG. 4 is a plan view of a modified form of spade drill blade which may be employed in conjunction with holders having different distances between the clamping screw and the bottom of the holder slot.

DESCRIPTION OF THE PREFERRED EMBODIMENTS

Referring first to FIGS. 1–3 the spade drill 1 herein comprises an elongated holder 2 which at its front end has a slot 3 diametrically thereacross in which the spade drill blade 4 is firmly clamped in coaxial relation to the holder by means of clamping screw 5 which extends eccentrically through a hole 6 in the blade 4, said clamping screw 5 having threaded engagement at 7 with the holder 2 on one side of the slot 3 and having its head 8 bearing through the washer 9 on the bottom 10 of a counterbore 11 on the other side of the slot 3. For convenience in handling, the washer 9 may be retained on the shank of the clamping screw 5.

As known, the blade 4 will generally be made of substantially the same thickness as the width of the slot 3. For example, the blade may be only 0.001 inch thinner than the width of the slot 3 so that only a minute amount of squeezing action of the slotted end of the holder by the clamping screw 5 will effect firm clamping of the blade 4. When the blade is clamped as aforesaid its rear end 12 is engaged with the bottom 14 of the slot 3 and the rearward extensions 15 on the blade 4 closely embrace diametrically opposite flats 16 on the holder 2 to accurately locate the blade 4 so that its centerline coincides with the holder axis. The blade 4 has cutting edges 17 at its front end.

As shown in the above-mentioned Milton L. Benjamin et al. patents, the holder 2 may be provided with suitable passages (not shown) for supply of coolant toward the cutting edges 17 of the blade 4 and, in addition, the holder 2 will be provided with diametrically opposite grooves 18 through which chips and spent coolant pass during the hole drilling operation.

In order to hold the blade 4 with its rear locating face 12 engaged with the bottom 14 of the slot 3 there is screwed into the holder 2 adjacent the head 8 and washer 9 a hollow hex set screw 19 which is coaxial with the clamping screw 5 but eccentric with respect to the blade hole 6 whereby the tightening of the said set screw 19 results in engagement of its tapered end 20 with the countersink 21 of the hole 6 along the line 23 thus to cam the blade 4 so that its rear end 12 is seated against the bottom 14 of the slot 3. Accordingly, when the spade drill 1 is retracted or withdrawn from the frilled hole, the inter-engagement of the set screw 19 and blade 4 at line 23 will prevent unseating or tilting of the blade 4 with reference to the bottom 14 of the slot 3 and hence the drilled hole will not be marred by such retraction or withdrawal.

When it is desired to mount the blade 4 in the holder 2, the clamping screw 5 and washer 9 are removed from the holder 2 and the set screw 19 is backed off sufficiently so that its tapered inner end 20 clears the upper side of the slot 3 whereupon the blade 4 may be slipped into place in the slot 3 with its rear end 12 seated against the bottom 14 of the slot 3 and with the extensions 15 closely embracing the diametrically opposite flats 16. When the blade is in this position, the set screw 19 is tightened only very slightly until the tapered end 20 just contacts the countersink 21 of the blade hole 6 on the side 23 of the countersink which is nearest the bottom 14 of the slot 3. After the set screw 19 has thus been lightly tightened so as not to effect any spreading apart of the slot 3, the clamping screw 5 and washer 9 are inserted into the holder 2 and upon firm tightening of the clamping screw 5 the slotted end of the holder 2 is squeezed to effect firm clamping of the blade 4 in the holder slot 3 with accompanying increased pressure engagement at 23 to retain the rear end 12 of the blade 4 in seated engagement with the bottom 14 of the slot 3.

From the foregoing it can be seen that the set screw 19 is operative not only to initially seat the rear end 12 of the blade 4 against the bottom 14 of the holder slot 3 but that the blade 4 is retained in such seated position against pullout forces when the spade drill 1 is retracted or withdrawn from the drilled hole.

The spade drill blade 4 shown in FIG. 4 is provided with intersecting holes 24 and 25 of equal or unequal diameter therethrough as required for use with holders having different sizes and locations of the clamping screw 5 with respect to the bottom 14 of the holder slot 3. In the case of the hole 25 the set screw 19 will engage the edge 26 in the same manner as just described in connection with FIGS. 1–3 but, when the clamping screw 5 extends eccentrically through the other hole 24, the set screw 19 will engage said hole 24 in the areas 27 to cam the blade 4 rearwardly to maintain the rear end 12 of the blade 4 in seated engagement with the bottom 14 of the holder slot 3.

I, therefore particularly point out and distinctly claim as my invention:

1. A spade drill comprising a holder formed with an axial slot diametrically across one end; a blade in said slot having cutting edges axially beyond said one end of said holder and parallel side faces to guide said drill in the hole formed by said cutting edges as said drill and a workpiece are relatively rotated and fed axially; a clamping screw extending transversely across the width of said slot and eccentrically through a hole in said blade, said clamping screw having an end portion in threaded engagement with said holder on one side of said slot and a head portion engaging tee bottom of a counterbore of said holder on the other side of said slot whereby tightening of said clamping screw squeezes the slotted end of said holder to clamp said blade; a tubular set screw having threaded engagement with said holder on said other side of said slot adjacent said head portion, said set screw being disposed coaxially around said clamping screw and having a tapered inner end portion which engages the side of the blade hole nearest the bottom of said slot thus to retain the rear end of said blade in seated engagement with the bottom of said slot during axial withdrawal of said drill from a hole drilled thereby.

2. The spade drill of claim 1 wherein the tapered end of said set screw has line contact engagement with the countersunk end of the blade hole.

3. The spade drill of claim 1 wherein the head portion of said clamping screw includes a washer engaged between the head of said clamping screw and the bottom of said counterbore.

4. The spade drill of claim 3 wherein said washer is axially retained on said clamping screw adjacent the head thereof.

5. The spade drill of claim 1 wherein said holder has coaxial threaded openings with which said clamping screw and set screw have threaded engagement.

6. The spade drill of claim 1 wherein the said blade hole compriss intersecting parallel bores with said set screw optionally engaging the portion of said blade hole nearest the bottom of the holder slot or the portions of the hole adjacent the intersection of said bores.

* * * * *